US010002562B2

(12) United States Patent
Zhuang et al.

(10) Patent No.: US 10,002,562 B2
(45) Date of Patent: Jun. 19, 2018

(54) WEAR COMPENSATION FOR A DISPLAY

(71) Applicant: INTEL CORPORATION, Santa Clara, CA (US)

(72) Inventors: Zhiming J. Zhuang, Sammamish, WA (US); Jun Jiang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/085,853

(22) Filed: Mar. 30, 2016

(65) Prior Publication Data

US 2017/0287391 A1    Oct. 5, 2017

(51) Int. Cl.
*G09G 3/3208* (2016.01)
*G06T 1/20* (2006.01)
*G06F 13/14* (2006.01)

(52) U.S. Cl.
CPC .......... *G09G 3/3208* (2013.01); *G06F 13/14* (2013.01); *G06T 1/20* (2013.01); *G09G 2310/08* (2013.01); *G09G 2320/029* (2013.01); *G09G 2320/0242* (2013.01); *G09G 2320/046* (2013.01); *G09G 2320/048* (2013.01)

(58) Field of Classification Search
None
See application file for complete search history.

(56) References Cited

U.S. PATENT DOCUMENTS

| | | | |
|---|---|---|---|
| 2004/0212573 A1 | 10/2004 | Sundahl et al. | |
| 2005/0110728 A1 | 5/2005 | Cok | |
| 2005/0110807 A1* | 5/2005 | Chang | G09G 3/3208 345/690 |
| 2006/0022305 A1 | 2/2006 | Yamashita | |
| 2006/0164407 A1 | 7/2006 | Cok | |
| 2011/0227964 A1* | 9/2011 | Chaji | G09G 3/006 345/690 |
| 2012/0133835 A1* | 5/2012 | Van Heesch | G09G 5/00 348/576 |

(Continued)

FOREIGN PATENT DOCUMENTS

KR    20150025987 A    3/2015

OTHER PUBLICATIONS

PCT International Search Report, PCT Application No. PCT/US2016/028634, dated Jul. 28, 2016, 3 pages.

(Continued)

*Primary Examiner* — Martin Mushambo
(74) *Attorney, Agent, or Firm* — International IP Law Group, P.L.L.C.

(57) ABSTRACT

Techniques for implementing aging compensation for a display are described. An example of an electronic device includes a display with a plurality of pixels, each pixel including one or more Light Emitting Diodes (LEDs). The electronic device also includes a wear compensation unit. The wear compensation unit is configured to receive input frame data corresponding to content to be displayed, determine a wear compensation configuration that identifies which of the plurality of pixels are compensated pixels and which are non-compensated pixels, and generate output frame data by adjusting the input frame data associated with the compensated pixels based on a degree of aging of the LEDs of the compensated pixels.

25 Claims, 7 Drawing Sheets

(56) References Cited

U.S. PATENT DOCUMENTS

| | | |
|---|---|---|
| 2012/0299973 A1 | 11/2012 | Jaffari et al. |
| 2014/0043318 A1 | 2/2014 | Choo et al. |
| 2014/0055500 A1* | 2/2014 | Lai .................. G09G 3/3208 345/690 |
| 2014/0168039 A1 | 6/2014 | Kim et al. |
| 2014/0168192 A1 | 6/2014 | Jeong et al. |
| 2014/0267444 A1 | 9/2014 | Hwang et al. |
| 2014/0267448 A1 | 9/2014 | Albrecht et al. |
| 2014/0306868 A1 | 10/2014 | Chaji |
| 2014/0375701 A1 | 12/2014 | Chaji et al. |
| 2015/0062202 A1 | 3/2015 | Lu |
| 2015/0103106 A1 | 4/2015 | Chaji et al. |
| 2016/0379550 A1 | 12/2016 | Jiang et al. |
| 2016/0379555 A1 | 12/2016 | Zhuang et al. |

OTHER PUBLICATIONS

PCT International Search Report, PCT Application No. PCT/US2016/028839, dated Jul. 28, 2016, 3 pages.
PCT International Search Report, PCT Application No. PCT/US2017/015404, dated May 16, 2017, 3 pages.

* cited by examiner

000
WEAR COMPENSATION FOR A DISPLAY

CROSS-REFERENCE TO RELATED APPLICATIONS

The present application is related to U.S. patent application Ser. No. 14/750,889 entitled "Wear Compensation for a Display," filed on Jun. 25, 2015, and U.S. patent application Ser. No. 14/751,015, entitled "Wear Compensation for a Display," filed on Jun. 25, 2015.

TECHNICAL FIELD

This disclosure relates generally to techniques for operating an electronic display. More specifically, the disclosure describes techniques for implementing wear compensation in a display such as a Light Emitting Diode (LED) display or an Organic LED (OLED) display.

BACKGROUND

OLEDs can be used to create digital displays in devices such as television screens, computer monitors, smart phones, gaming consoles, and others. OLEDs provide several advantages compared to other display technologies, including higher color gamut, lighter and thinner display panels, better power efficiency, and others. However, the materials used to make OLEDs tend to degrade based on cumulative usage. Degradation in OLED displays is characterized by the loss of luminance over time. Because the degradation rate is different for the three primary colors and the degree of degradation depends on the individual pixel usage, undesirable effects such as color shift and burn-in can take place.

DETAILED DESCRIPTION

The subject matter disclosed herein relates to techniques to compensate for the wear experienced by an OLED display. As explained above, OLED displays tend to degrade differently depend on the color and the cumulative usages of each individual pixel's, which can lead to color shifting and screen burn-in. This has prevented the widespread adoption of OLED displays in Personal Computers (PCs). To reduce the effects of OLED wear, compensation techniques can be applied to compensate the gradual loss of luminance that OLED displays experience over time. In one type of compensation technique, the display operating history is tracked and used to determine an expected degree of luminance degradation for each pixel. For example, the display input frame data can be accumulated over time to determine the effective aging time experienced by individual pixels. Each time a new image frame is to be rendered to the display, the display luminance for each pixel can be modified based on the aging experienced for that pixel. Modifying each pixel in this way can quickly consume a large amount of memory and processing resources.

This disclosure describes techniques to reduce the amount of system resources used for modifying the display luminance of a display to account for pixel aging. More specifically, the present disclosure provides a partial wear compensation technique wherein wear compensation is applied to a subset of pixels, rather than all of the pixels. For high resolution screens, the difference in display quality between full wear compensation and partial wear compensation may not be noticeable by the viewer.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
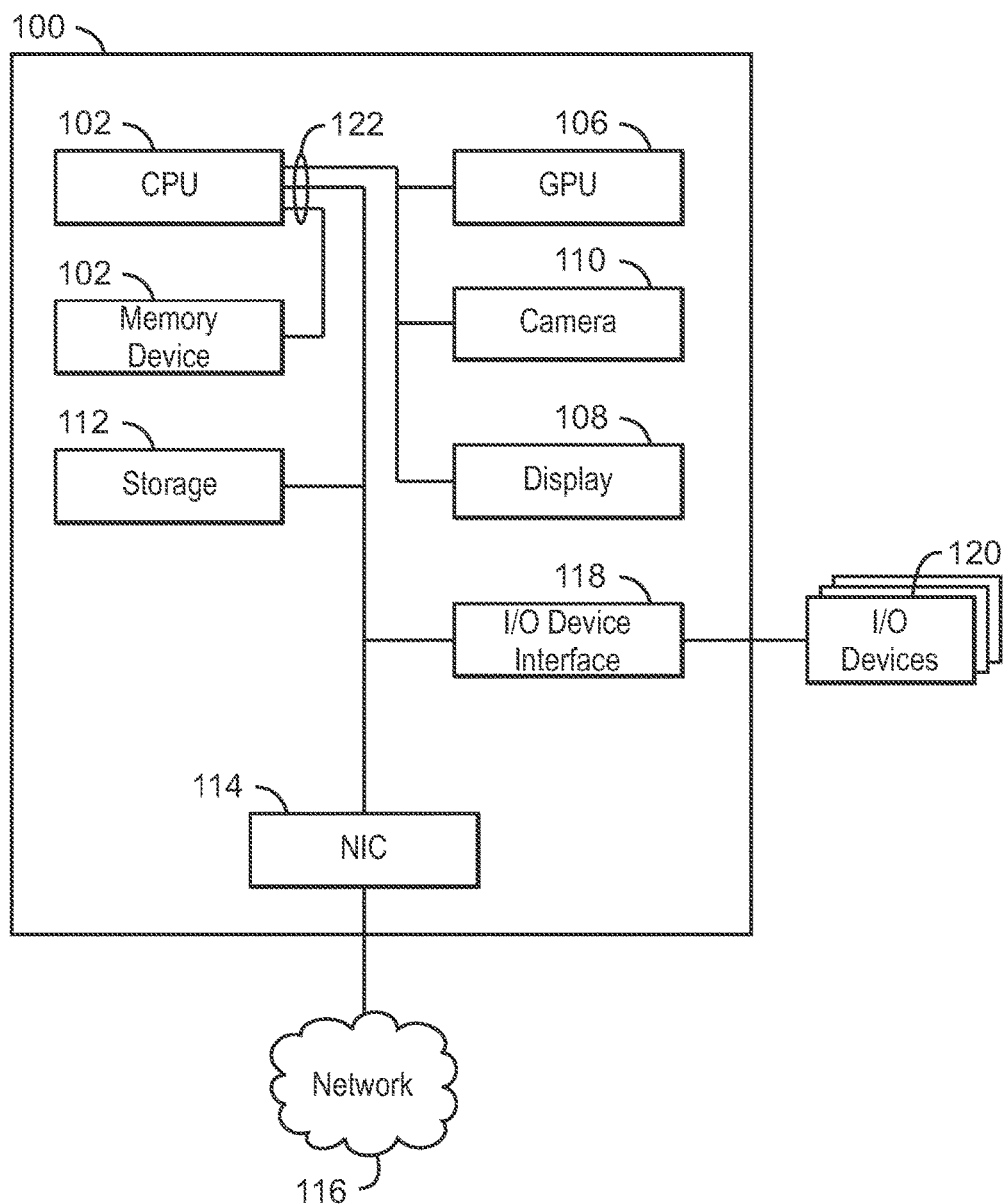
FIG. 1 is a block diagram of an example electronic device that can implement the wear compensation techniques described herein.

FIG. 1 is a block diagram of an example electronic device that can implement the wear compensation techniques described herein. The computing device 100 may be, for example, a computing device such as smart phone, laptop computer, ultrabook, desktop computer, or tablet computer, among others. The computing device 100 may also be a display device such as a digital sign or television, for example. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The memory device 104 can be used to store data and computer-readable instructions that, when executed by the processor, direct the processor to perform various operations in accordance with embodiments described herein.

The computing device 100 may also include a graphics processor 106 that processes video signals or computer generated graphics. The graphics processor 106 is configured to process data related to the generation of graphics to be sent to a display 108. The display 108 may be a built-in component of the computing device 100 or externally coupled to the computing device 100. In some examples, the display is an OLED display. However, the present techniques may also be implemented in any type of display that use arrayed emitters for display illumination, such as plasma displays, or displays that use other types of LEDs, for example.

The computing device 100 can also include a camera 110 configured to capture still images or video. For example, the camera 110 may be a Web cam. Images or video captured by the camera 110 can be sent to various other components of the computing device 100, such as the display 108.

The computing device 100 may also include a storage device 112. The storage device 112 is a physical memory such as a hard drive, an optical drive, a flash drive, an array of drives, or any combinations thereof. The storage device 112 may also include remote storage devices. The computing device 100 may also include a network interface controller (NIC) 114 configured to connect the computing device 100 through to a network 116. The network 116 may be a wide area network (WAN), local area network (LAN), or the Internet, among others.

The computing device 100 may also include an input/output (I/O) device interface 118 configured to connect the computing device 100 to one or more I/O devices 120. The I/O devices 120 may include, for example, a printer, a scanner, a keyboard, and a pointing device such as a mouse, touchpad, or touchscreen, among others. The I/O devices 120 may be built-in components of the computing device 100, or may be devices that are externally connected to the computing device 100.

Various additional components may be included depending on the design considerations for a particular implementation. For example, the computing device 100 may also include a memory controller hub that handles communications between the processor 102, memory 104, graphics processor 106, I/O device interface 118, and other components.

Communications between various components of the computing device 100 can be performed over one or more data busses 122. The bus architecture shown in FIG. 1 is just one example of a bus architecture that can be used with the techniques disclosed herein. In some examples, the data bus 122 may be a single bus that couples all of the components of the computing device 100 according to a particular communication protocol. Furthermore, the computing device 100 can also include any suitable number of data busses 122 of varying types, which may use different communication protocols to couple specific components of the computing device according to the design considerations of a particular implementation.

The graphics processor 106 may be configured to collect OLED aging data and implement wear compensation based on the OLED aging data. In an OLED display, each pixel may include three diodes, one for the color red, one for the color green, and one for the color blue. For the present disclosure, Red-Green-Blue (RGB) pixels are described. However, it will be appreciated that other arrangements with fewer or more diodes and different colors are also possible. For examples, in addition to the red, green, and blue diodes, each pixel could also have an additional yellow pixel. Each pixel may be activated by a string of data that describes the intensity with which to illuminate of each of the diodes in the pixel. The data that activates the pixels may be referred to herein as RGB data. The term "frame data" refers to the RGB data for all of the pixels for a single frame of display content.

The OLED aging data is a measure of the total accumulated charge that has passed through a particular diode and is a function of the amount of time that a diode has been turned on and the intensity over that time. The graphics processor 106 may collect OLED aging data for each diode of one or more individual pixels. Based on the OLED aging data, the graphics processor 106 can compensate the brightness of each diode of a pixel by adjusting the RGB data before sending the RGB data to the display 108. The OLED aging data may be collected for each pixel individually or a more limited set of sampling points.

The graphics processor 106 can also be configured to perform wear compensation for some or all of the pixels. The number and location of the pixels to which wear compensation will be applied may be referred to herein as the compensation configuration. The compensation configuration may be affected by a number of factors, including the size and display resolution of the screen, the amount of processing resources and memory available for wear compensation processing, and others.

The particular wear compensation configuration being implemented at any given time may be referred to as the compensation mode. The compensation modes can include a full compensation mode and one or more partial compensation modes. The full compensation modes refers to a mode wherein wear compensation is applied to each pixel. A partial compensation mode refers to a mode in which wear compensation is applied to a subset of the pixels, for example, half of the pixels, one quarter of the pixels, and others. The subset of pixels to which wear compensation is applied may be distributed over the display panel in any number of ways. For example, in some partial compensation modes, wear compensation is applied to odd lines but not even lines. Various other techniques are also possible, as described in FIGS. 2-4.

In some examples, the graphics processor 106 is able to switch between a different compensation modes. The switch between different compensation modes may be triggered by various factors, including user selection of a particular mode, a power saving mode or battery level of the electronic device, the content being displayed, and others. In some examples, the compensation mode is selected based on the display resolution, or a combination of the display resolution and the distance of the user from the display.

It is to be understood that the block diagram of FIG. 1 is not intended to indicate that the electronic device 100 is to include all of the components shown in FIG. 1. Rather, the electronic device 100 can include fewer or additional components not illustrated in FIG. 1. Furthermore, the components may be coupled to one another according to any suitable system architecture, including the system architecture shown in FIG. 1 or any other suitable system architecture. For example, embodiments of the present techniques can be implemented in a System-On-a-Chip (SOC), or a multi-chip module.

Figure 2:
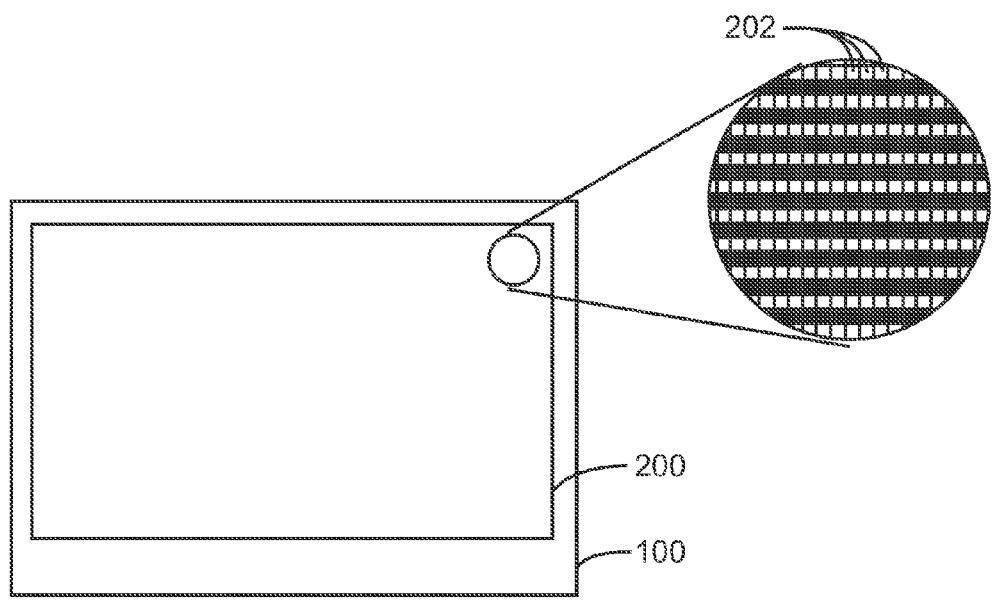
FIG. 2 is an illustration of a display panel showing an example of a wear compensation configuration.

FIG. 2 is an illustration of a display panel showing an example of a wear compensation configuration. FIG. 2 shows the electronic device 100 and the display panel 200. A portion of the display panel 200 is enlarged to represent individual pixels 202 of the display panel 200. Each square in the enlarged view represents an individual pixel. Pixels with wear compensation applied are referred to as compensated pixels and are shown as dark squares. Pixels with no wear compensation applied are referred to as non-compensated pixels and are shown as light squares. Each horizontal line of pixels may represent a scan line.

The wear compensation shown in FIG. 2 is applied to every other scan line, which may be every even scan line or every odd scan line, for example. The wear compensation configuration can also change after each successive frame. For example, the wear compensation configuration may alternate between even and odd scan lines for each successive frame. In some examples, the wear compensation configuration can also remain constant over successive frames.

Other variations of the wear compensation configuration shown in FIG. 2 are also possible. For example, rather than every other scan line, the wear compensation may be applied to every third scan line, every forth scan line, and so on. Furthermore, the wear compensation could also be applied to vertical columns of pixels, rather than horizontal rows.

Figure 3:
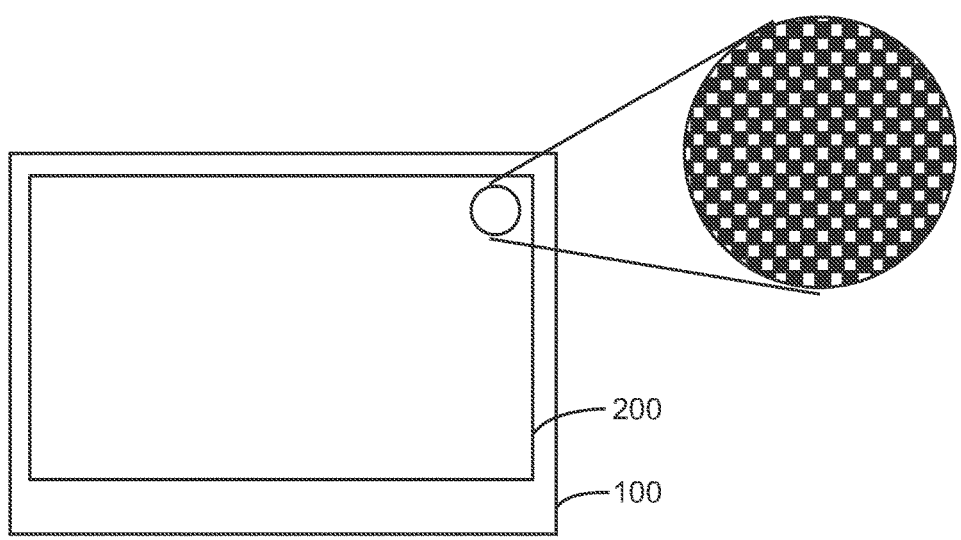
FIG. 3 is an illustration of a display panel showing another example of a wear compensation configuration.

FIG. 3 is an illustration of a display panel showing another example of a wear compensation configuration. As in FIG. 2, FIG. 3 shows the electronic device 100 and the display panel 200, with a portion of the display panel 200 enlarged to represent individual pixels 202. The wear compensation shown in FIG. 3 is applied to the pixels in a checkerboard pattern. In this way, pixels will be age compensated and half of the pixels will not be age compensated. The wear compensation configuration shown in FIG. 3 may remain constant over successive frames or may change after each successive frame. For example, after each frame the compensated pixels may flip to become no-compensated pixels and the non-compensated pixels may flip to become compensated pixels.

Figure 4:
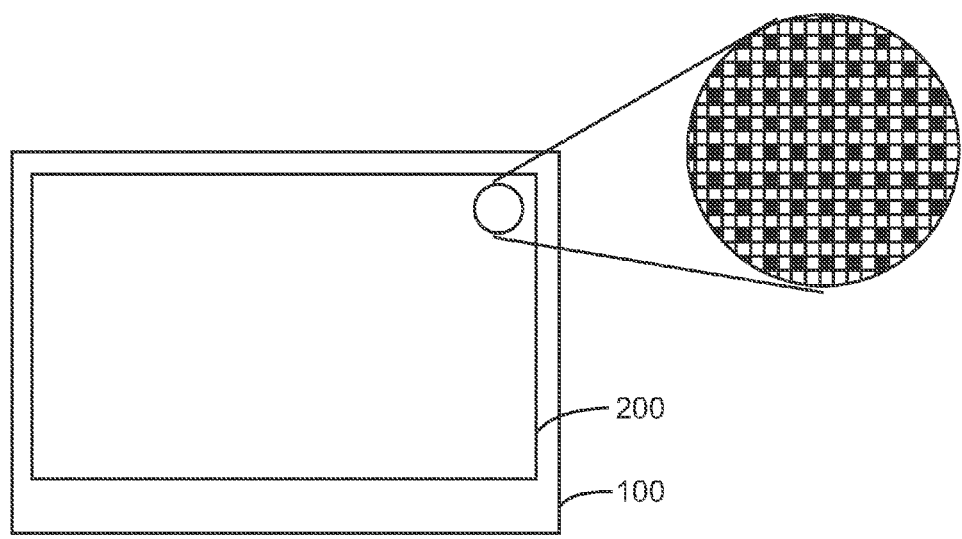
FIG. 4 is an illustration of a display panel showing another example of a wear compensation configuration.

FIG. 4 is an illustration of a display panel showing another example of a wear compensation configuration. As in FIGS. 2 and 3, FIG. 4 shows the electronic device 100 and the display panel 200, with a portion of the display panel 200 enlarged to represent individual pixels 202. In FIG. 4, the pixels alternate between compensated pixels and non-compensated pixels in both the horizontal direction and the vertical direction, so that each compensated pixel is surrounded by non-compensated pixels. In this way, one out of every four pixels is age compensated.

The wear compensation configuration shown in FIG. 4 may remain constant over successive frames or may change after each successive frame. For a group of four pixels, the age compensated pixel may rotate from one pixel position to another within the group. In this way, each pixel of the display panel would become the age compensated pixel for one out of every four successive frame. It be appreciated that many additional wear compensation configurations are possible in addition what is shown and described in FIGS. 2-4.

Figure 5:
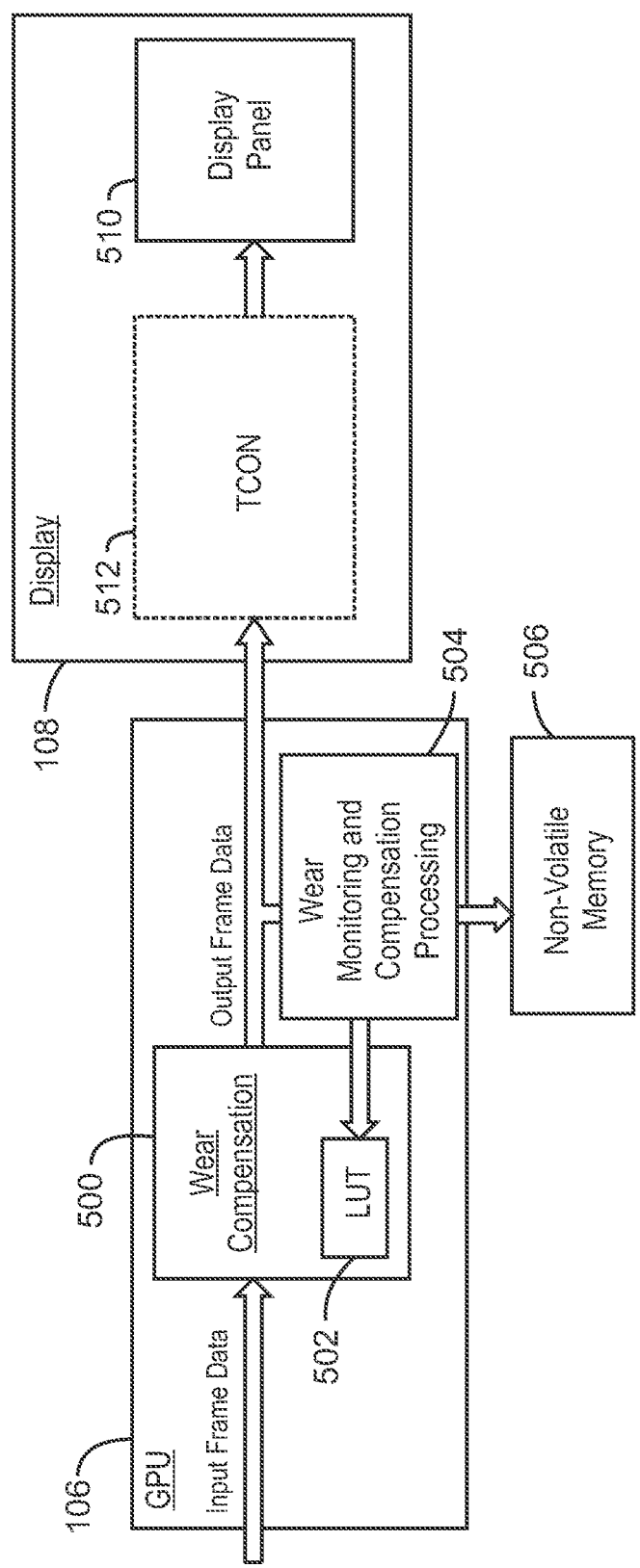
FIG. 5 is a block diagram of an example graphics processor configured to accumulate aging data and implement wear compensation based on the data.

FIG. 5 is a block diagram of an example graphics processor configured to accumulate aging data and implement wear compensation based on the data. The graphics processor 106 includes a wear compensation unit 500 and a wear monitoring and compensation processing unit 504. The wear compensation unit 500 receives input frame data and adjusts the intensity of each OLED of each compensated pixel accordingly. Intensity adjustments to be applied to each OLED may be stored to a lookup table (LUT) 502 by the wear monitoring and compensation processing unit 504. The data stored to the lookup table can be based on predetermined device decay models for each type of OLED and relates the amount of OLED aging to the level of compensation for the OLED.

In some examples, the adjustment for a particular OLED is the adjustment that will compensate the OLED for the amount of aging experienced by that OLED. In some examples, the wear compensation applied to a particular OLED may be increased above that which would otherwise be indicated by the level of aging experienced by that OLED. If neighboring pixels are non-compensated, the apparent compensation will be an average of the wear compensation applied to the compensated pixel divided between the neighboring non-compensated pixels. Thus, the apparent compensation may be closer to what would be expected if all of the pixels are compensated pixels. The degree by which the wear compensation is increased may be determined by an over-compensation factor, which is applied to all of the compensated pixels. The over-compensation factor may be approximately equal to the ratio of compensated pixels to non-compensated pixels in the wear compensation configuration.

The wear monitoring and compensation processing unit 504 samples the frame data that is output from the wear compensation unit 500 to the display 108. The wear monitoring and compensation processing unit 504 can determine for each pixel of the display, the degree of aging experienced for each OLED based on the frame data. The data, such as RGB data, specifies the intensity by which each OLED in a pixel is driven. The actual degree of aging is a product of the intensity with which the OLED is being driven and the duration that the OLED is driven at the specified intensity. The OLED will be driven at the intensity specified by the output frame data for the duration of one frame, which depends on the refresh rate. For example, for 60 Hertz refresh rate, the display refreshes 60 times per second and the actual duration of one frame is approximately $1/60$ of a second. The sampling frequency can be equal to or less than the refresh rate.

The degree of aging measured for a particular OLED can be used as an input to the LUT 502 to obtain a corresponding degree of compensation to be applied to the OLED to compensate for the aging of the OLED. To acquire the degree of aging from the LUT 502, the LUT 502 is searched using the degree of aging as input, and the degree of compensation is returned as the output. In some examples, the LUT 502 is searched in a linear fashion starting at the first input. This process can be repeated for the OLEDs of each compensated pixel and each image frame.

The wear monitoring and compensation processing unit 504 can also store accumulated aging data to a non-volatile memory 506. The non-volatile memory 506 can be the memory device 104 or storage device 112 of FIG. 1, or some other memory device, which may be dedicated to storing the accumulated aging data. The non-volatile memory 506 may also be included in the graphics processor 106 or coupled to the graphics processor 106 through a data bus. Storing the accumulated aging data to the non-volatile memory 506 prevents the aging data from being lost over the life of the display 108, for example, due to power loss. The accumulated aging data may be the total level of aging experienced by the pixels. Additionally, accumulated aging data may be stored for each pixel individually or for groups of pixels.

As mentioned above, the display wear compensation unit 500 receives input frame data, performs wear compensation based on the accumulated aging data stored to the lookup table 502, and outputs compensated frame data to the display 108. The display 108 includes a display panel 510, which includes the matrix of pixels, and a timing controller (TCON) 512. The timing controller 512 is the data sink for the output frame data and drives the display panel 510. The input frame data can be received from any suitable source. With reference to FIG. 1, the source of the input frame data can be an application running on the processor 102, a network interface such as the NIC 114, a television tuner (not shown), one of the I/O devices 120, or the camera 110, among others.

The display wear compensation unit 500 may implement any suitable wear compensation configuration, including those described above and others. The wear compensation configuration used by the display wear compensation unit 500 may be determined by the graphics processor 106, or may be received by the graphics processor 106 from another component, such as an application running on the processor 102 (FIG. 1). In some examples, the display wear compensation unit 500 is programmed to implement a specific pre-set wear compensation configuration. In some examples, the display wear compensation unit 500 is configured so that the wear compensation configuration can be changed in response to various inputs from an application, the user, or in response to detection of certain conditions. The graphics processor 106 may receive an indicator from an application such as an operating system, wherein the indicator is used to identify the wear compensation configuration to be implemented by the display wear compensation unit 500.

In some examples, the wear compensation configuration is selected based on a power saving state of the computing device or a battery level. For example, if the battery level falls below a certain threshold, the computing device may enter power saving state defined by various power saving measures, such as reducing the clock speed of the processor, disabling certain components of the computing device 100, reducing the screen brightness, and others. One feature of the power saving state may be to switch to a wear compensation configuration that uses less processing power and memory. For example, the wear compensation configuration may switch from one in which all pixels are compensated to one in which half of the pixels are compensated, or from one in which half the pixels are compensated to one in which one in four of the pixels are compensated, and so on.

In some examples, the wear compensation configuration may be specified by the user. This may enable the user to override a default wear compensation configuration and/or a compensation configuration automatically selected by an application, such as one selected to implement a power savings mode.

In some examples, the wear compensation configuration can be determined based on the resolution of the display panel 510. The higher the display resolution, the less able the user will be to notice the effect partial wear compensation. In many cases, human eyesight is not able to distinguish between separate pixels for display resolutions of approximately 300 Pixels Per Inch (PPI) and higher. Accordingly, for a 600 PPI display panel, the graphics processing unit 106 may select a wear compensation configuration in which only half of the pixels are compensated without any apparent degradation of the displayed image. The graphics processing unit 106 may obtain the display resolution information from the display or from an application such as a display driver, an operating system, and the like.

In some examples, the wear compensation configuration can be determined based on the resolution of the display panel 510 and the distance of the user from the display. The distance of the user from the display may be determined, for example, from a depth finder included in the electronic device 100. The wear compensation configuration can change in response to changes in the user's distance from the display panel 510. The farther the user is from the electronic, the fewer compensated pixels may be included in the wear compensation configuration without the user noticing a loss in image quality.

It is to be understood that the block diagram of FIG. 5 is not intended to indicate that the graphics processor 106 is to include all of the components shown in FIG. 5. Rather, the graphics processor 106 can include fewer or additional components not illustrated in FIG. 5. Furthermore, the components can be implemented in hardware or a combination of hardware and software. For example, the components may be implemented in one or more Application Specific Integrated Circuits (ASICs), Field Programmable Gate Array (FPGAs), microcontrollers, or an arrangement of logic gates implemented in one or more integrated circuits, for example. Additionally, the components may be implemented in a single processor or multiple processors.

Figure 6:
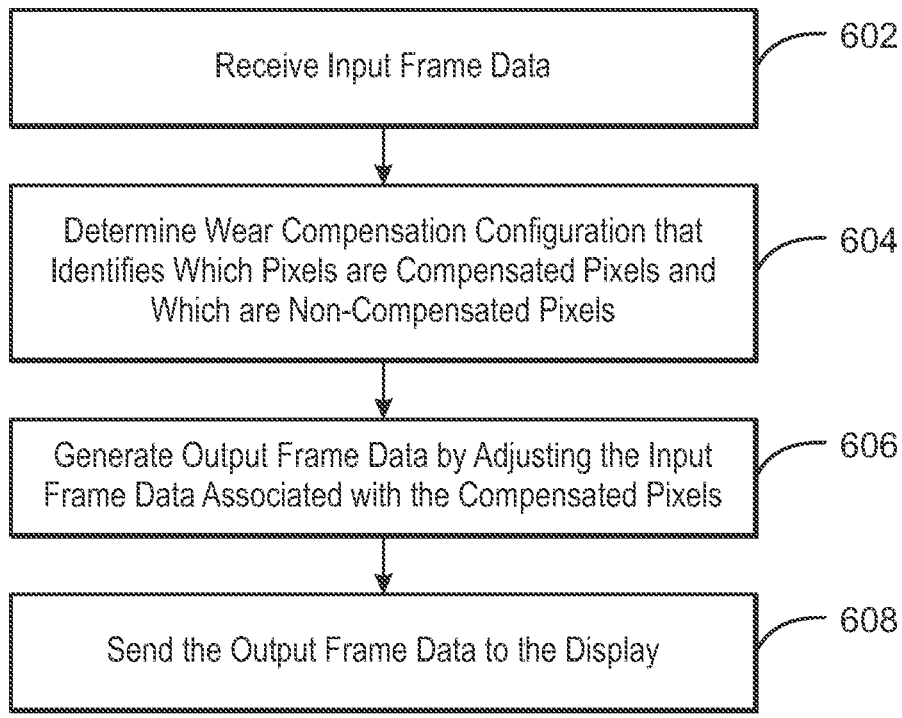
FIG. 6 is a process flow diagram of an example method to implement wear compensation for a display.

FIG. 6 is a process flow diagram of an example method to implement wear compensation for a display. The method 600 may be implemented by any suitable electronic device that includes a pixel-based display, such as the device shown in FIG. 1. The display can include a plurality of display elements, such as LEDs, OLEDs, and others. In some examples, the method 600 is performed by logic included in a graphics processor, such as the graphics processing unit 106 of FIG. 6. The logic is embodied in hardware, such as logic circuitry, microcontrollers, integrate circuits, or one or more processors configured to execute instructions stored in a non-transitory, computer-readable medium.

At block 602, input frame data corresponding to content to be displayed is received. The content may be dynamic content such as video, or static content such as still images, for example. The content may also be a mixture of dynamic and static content.

At block 604, a wear compensation configuration is determined. The wear compensation configuration identifies which pixels are compensated pixels and which are non-compensated pixels. The wear compensation configuration may be determined by receiving a selection from a user, or receiving a signal from an application running on a processor such as the CPU 102 shown in FIG. 1. The wear compensation configuration can also be determined by the graphics processor based on inputs received from other components of the electronic device. Additionally, the wear compensation configuration may be determined based on any suitable factor or combination of factors, such as the display resolution, the distance of the user from the display, a power saving mode of the electronic device, or a combination thereof.

At block 606, output frame data is generated by adjusting the input frame data associated with the compensated pixels. The compensation applied to the compensated pixels is based on a degree of aging of the LEDs of the compensated pixels.

At block 608, the compensated output frame data is sent to the display. The compensated output frame data may also be sampled to accumulate aging data that describes the degree of aging of the LEDs. The method may then return to block 602. The accumulated aging data from block 608 is used in the next iteration of the method at block 606.

The method 600 should not be interpreted as meaning that the blocks are necessarily performed in the order shown. Furthermore, fewer or greater actions can be included in the method 600 depending on the design considerations of a particular implementation.

Figure 7:
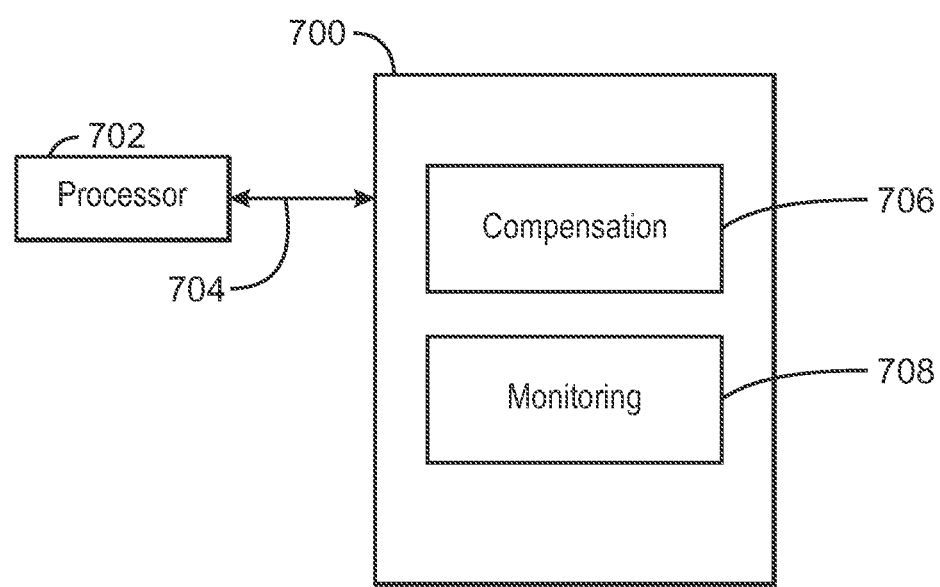
FIG. 7 is a block diagram showing a computer-readable medium that contains logic for performing wear compensation for a display.

FIG. 7 is a block diagram showing a computer-readable medium 700 that contains logic for performing aging compensation for a display. The medium 700 may be a computer-readable medium, including a non-transitory medium that stores code that can be accessed by a processor 702 over a computer bus 704. For example, the computer-readable medium 700 can be volatile or non-volatile data storage device. The medium 700 can also be a logic unit, such as an Application Specific Integrated Circuit (ASIC), a Field Programmable Gate Array (FPGA), or an arrangement of logic gates implemented in one or more integrated circuits, for example.

The medium 700 may include modules 706 and 708 configured to perform the techniques described herein. In some embodiments, the modules 706 and 708 may be modules of computer code configured to direct the operations of the processor 702. For example, the compensation module 706 may be configured to receive input frame data corresponding to content to be displayed on a display of an electronic device, adjust the input frame data based on a degree of aging of the LEDs, and send the output frame data to the display. Furthermore, the LEDs of those pixels identified as compensated pixels will receive the aging compensation, while pixels identified as non-compensated pixels will not receive the aging compensation. The monitoring module may 708 be configured to sample the output frame data to accumulate aging data that describes the degree of aging of the LEDs.

The block diagram of FIG. 7 is not intended to indicate that the medium 700 is to include all of the components shown in FIG. 7. Further, the medium 700 may include any number of additional components not shown in FIG. 7, depending on the details of the specific implementation.

EXAMPLES

Example 1 is an electronic device to implement aging compensation for a display. The electronic device includes a display with a plurality of pixels, each pixel having one or more Light Emitting Diodes (LEDs). The electronic device also includes a wear compensation unit to: receive input frame data corresponding to content to be displayed; determine a wear compensation configuration that identifies which of the plurality of pixels are compensated pixels and which are non-compensated pixels; generating output frame data by adjusting the input frame data associated with the compensated pixels based on a degree of aging of the LEDs of the compensated pixels; and send the output frame data to the display.

Example 2 includes the electronic device of example 1, including or excluding optional features. In this example, the wear compensation configuration causes the output frame data to alternate between scan lines with compensated pixels and scan lines with non-compensated pixels.

Example 3 includes the electronic device of any one of examples 1 to 2, including or excluding optional features. In this example, the wear compensation configuration causes the compensated pixels to form a checkerboard pattern.

Example 4 includes the electronic device of any one of examples 1 to 3, including or excluding optional features. In this example, the wear compensation configuration causes one out of four of the plurality of pixels to be identified as a compensated pixel.

Example 5 includes the electronic device of any one of examples 1 to 4, including or excluding optional features. In this example, the wear compensation configuration changes between successive image frames.

Example 6 includes the electronic device of any one of examples 1 to 5, including or excluding optional features. In this example, the wear compensation configuration is determined based at least in part on a resolution of the display.

Example 7 includes the electronic device of any one of examples 1 to 6, including or excluding optional features. In this example, the wear compensation configuration is determined based at least in part on a resolution of the display and a distance of the user from the display.

Example 8 includes the electronic device of any one of examples 1 to 7, including or excluding optional features. In this example, adjusting the input frame data associated with the compensated pixels includes increasing a level of wear compensation applied to the compensated pixels by an over-compensation factor.

Example 9 includes the electronic device of any one of examples 1 to 8, including or excluding optional features. In this example, the electronic device is a laptop computer.

Example 10 includes the electronic device of any one of examples 1 to 9, including or excluding optional features. In this example, the LEDs are Organic LEDs (OLEDs).

Example 11 is a method of implementing aging compensation for a display. The method includes receiving input frame data corresponding to content to be displayed on a display of an electronic device, the display including a plurality of pixels, each pixel including one or more Light Emitting Diodes (LEDs). The method also includes determining a wear compensation configuration that identifies which of the plurality of pixels are compensated pixels and which are non-compensated pixels; generating output frame data by adjusting the input frame data associated with the compensated pixels based on a degree of aging of the LEDs of the compensated pixels; and sending the output frame data to the display.

Example 12 includes the method of example 11, including or excluding optional features. In this example, adjusting the input frame data includes applying wear compensation to alternating scan lines.

Example 13 includes the method of any one of examples 11 to 12, including or excluding optional features. In this example, the compensated pixels to form a checkerboard pattern.

Example 14 includes the method of any one of examples 11 to 13, including or excluding optional features. In this example, adjusting the input frame data includes applying wear compensation to one out of four of the plurality of pixels.

Example 15 includes the method of any one of examples 11 to 14, including or excluding optional features. In this example, the wear compensation configuration changes between successive image frames.

Example 16 includes the method of any one of examples 11 to 15, including or excluding optional features. In this example, the method includes determining the wear compensation configuration based at least in part on a resolution of the display.

Example 17 includes the method of any one of examples 11 to 16, including or excluding optional features. In this example, the method includes determining the wear compensation configuration based at least in part on a resolution of the display and a distance of the user from the display.

Example 18 includes the method of any one of examples 11 to 17, including or excluding optional features. In this example, the method includes increasing a level of wear compensation applied to the compensated pixels by an over-compensation factor.

Example 19 includes the method of any one of examples 11 to 18, including or excluding optional features. In this example, the electronic device is a laptop computer.

Example 20 includes the method of any one of examples 11 to 19, including or excluding optional features. In this example, the LEDs are Organic LEDs (OLEDs).

Example 21 is a computer-readable medium. The computer-readable medium includes instructions that direct the processor to receive input frame data corresponding to content to be displayed on a display of an electronic device, the display including a plurality of pixels, each pixel including one or more Light Emitting Diodes (LEDs). The computer-readable medium also includes instructions that direct the processor to determine a wear compensation configuration that identifies which of the plurality of pixels are compensated pixels and which are non-compensated pixels; generate output frame data by adjusting the input frame data associated with the compensated pixels based on a degree of aging of the LEDs of the compensated pixels; and send the output frame data to the display.

Example 22 includes the computer-readable medium of example 21, including or excluding optional features. In this example, the wear compensation configuration causes the output frame data to alternate between scan lines with compensated pixels and scan lines with non-compensated pixels.

Example 23 includes the computer-readable medium of any one of examples 21 to 22, including or excluding optional features. In this example, the wear compensation configuration causes the compensated pixels to form a checkerboard pattern.

Example 24 includes the computer-readable medium of any one of examples 21 to 23, including or excluding optional features. In this example, the wear compensation configuration causes wear compensation to be applied to one out of four of the plurality of pixels.

Example 25 includes the computer-readable medium of any one of examples 21 to 24, including or excluding optional features. In this example, the computer-readable medium includes instructions that direct the processor to apply a different wear compensation configuration between successive image frames.

Example 26 includes the computer-readable medium of any one of examples 21 to 25, including or excluding optional features. In this example, the computer-readable medium includes instructions that direct the processor to determine the wear compensation configuration based at least in part on a resolution of the display.

Example 27 includes the computer-readable medium of any one of examples 21 to 26, including or excluding optional features. In this example, the computer-readable medium includes instructions that direct the processor to determine the wear compensation configuration based at least in part on a resolution of the display and a distance of the user from the display.

Example 28 includes the computer-readable medium of any one of examples 21 to 27, including or excluding optional features. In this example, the computer-readable medium includes instructions that direct the processor to increase a level of wear compensation applied to the compensated pixels by an over-compensation factor.

Example 29 includes the computer-readable medium of any one of examples 21 to 28, including or excluding optional features. In this example, the computer-readable medium is included in a laptop computer.

Example 30 includes the computer-readable medium of any one of examples 21 to 29, including or excluding optional features. In this example, the LEDs are Organic LEDs (OLEDs).

Example 31 is an electronic device to implement aging compensation for a display of the electronic device. The electronic device includes logic to receive input frame data corresponding to content to be displayed on a display of an electronic device, the display including a plurality of pixels, each pixel including one or more Light Emitting Diodes (LEDs). The electronic device also includes logic to determine a wear compensation configuration that identifies which of the plurality of pixels are compensated pixels and which are non-compensated pixels; logic to generate output frame data by adjusting the input frame data associated with the compensated pixels based on a degree of aging of the LEDs of the compensated pixels; and logic to send the output frame data to the display.

Example 32 includes the electronic device of example 31, including or excluding optional features. In this example, the wear compensation configuration causes the output frame data to alternate between scan lines with compensated pixels and scan lines with non-compensated pixels.

Example 33 includes the electronic device of any one of examples 31 to 32, including or excluding optional features. In this example, the wear compensation configuration causes the compensated pixels to form a checkerboard pattern.

Example 34 includes the electronic device of any one of examples 31 to 33, including or excluding optional features. In this example, the wear compensation configuration causes wear compensation to be applied to one out of four of the plurality of pixels.

Example 35 includes the electronic device of any one of examples 31 to 34, including or excluding optional features. In this example, the electronic device includes logic to apply a different wear compensation configuration between successive image frames.

Example 36 includes the electronic device of any one of examples 31 to 35, including or excluding optional features. In this example, the electronic device includes logic to determine the wear compensation configuration based at least in part on a resolution of the display.

Example 37 includes the electronic device of any one of examples 31 to 36, including or excluding optional features. In this example, the electronic device includes logic to determine the wear compensation configuration based at least in part on a resolution of the display and a distance of the user from the display.

Example 38 includes the electronic device of any one of examples 31 to 37, including or excluding optional features. In this example, the electronic device includes logic to increase a level of wear compensation applied to the compensated pixels by an over-compensation factor.

Example 39 includes the electronic device of any one of examples 31 to 38, including or excluding optional features. In this example, the computer-readable medium is included in a laptop computer.

Example 40 includes the electronic device of any one of examples 31 to 39, including or excluding optional features. In this example, the LEDs are Organic LEDs (OLEDs).

Example 41 is an apparatus configured to implement aging compensation for a display. The apparatus includes means for receiving input frame data corresponding to content to be displayed on a display of an electronic device, the display including a plurality of pixels, each pixel including one or more Light Emitting Diodes (LEDs). The apparatus also includes means for determining a wear compensation configuration that identifies which of the plurality of pixels are compensated pixels and which are non-compensated pixels; means for generating output frame data by adjusting the input frame data associated with the compensated pixels based on a degree of aging of the LEDs of the compensated pixels; and means for sending the output frame data to the display.

Example 42 includes the apparatus of example 41, including or excluding optional features. In this example, the means for generating output frame data adjusts the input frame data by applying wear compensation to alternating scan lines.

Example 43 includes the apparatus of any one of examples 41 to 42, including or excluding optional features. In this example, the means for generating output frame data adjusts the input frame data by applying wear compensation to a checkerboard pattern of compensated pixels.

Example 44 includes the apparatus of any one of examples 41 to 43, including or excluding optional features. In this example, the means for generating output frame data adjusts the input frame data by applying wear compensation to one out of four of the plurality of pixels.

Example 45 includes the apparatus of any one of examples 41 to 44, including or excluding optional features. In this example, the apparatus includes means for changing the wear compensation configuration between successive image frames.

Example 46 includes the apparatus of any one of examples 41 to 45, including or excluding optional features. In this example, the apparatus includes means for determining the wear compensation configuration based at least in part on a resolution of the display.

Example 47 includes the apparatus of any one of examples 41 to 46, including or excluding optional features. In this example, the apparatus includes means for determining the wear compensation configuration based at least in part on a resolution of the display and a distance of the user from the display.

Example 48 includes the apparatus of any one of examples 41 to 47, including or excluding optional features. In this example, the apparatus includes means for increasing a level of wear compensation applied to the compensated pixels by an over-compensation factor.

Example 49 includes the apparatus of any one of examples 41 to 48, including or excluding optional features. In this example, the electronic device is a laptop computer.

Example 50 includes the apparatus of any one of examples 41 to 49, including or excluding optional features. In this example, the LEDs are Organic LEDs (OLEDs).

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An electronic device comprising:
   a display comprising a plurality of pixels, each pixel comprising one or more Light Emitting Diodes (LEDs);
   a wear compensation unit to:
   receive input frame data corresponding to content to be displayed;
   determine a wear compensation configuration that identifies which of the plurality of pixels are compensated pixels and which are non-compensated pixels, wherein the wear compensation configuration is a predetermined uniform and repeating pattern of pixels;
   generating output frame data by adjusting the input frame data associated with the compensated pixels based on the degree of aging of the LEDs of the compensated pixels; and
   send the output frame data to the display.

2. The electronic device of claim 1, wherein the wear compensation configuration causes the output frame data to alternate between scan lines with compensated pixels and scan lines with non-compensated pixels.

3. The electronic device of claim 1, wherein the wear compensation configuration causes the compensated pixels to form a checkerboard pattern.

4. The electronic device of claim 1, wherein the wear compensation configuration causes one out of four of the plurality of pixels to be identified as a compensated pixel.

5. The electronic device of claim 1, wherein the wear compensation configuration changes between successive image frames.

6. The electronic device of claim 1, wherein the wear compensation configuration is determined based at least in part on a resolution of the display.

7. The electronic device of claim 1, wherein the wear compensation configuration is determined based at least in part on a resolution of the display and a distance of the user from the display.

8. The electronic device of claim 1, wherein adjusting the input frame data associated with the compensated pixels comprises increasing a level of wear compensation applied to the compensated pixels by an over-compensation factor.

9. The electronic device of claim 1, wherein the electronic device is a laptop computer.

10. The electronic device of claim 1, wherein the LEDs are Organic LEDs (OLEDs).

11. A method, comprising:
receiving input frame data corresponding to content to be displayed on a display of an electronic device, the display comprising a plurality of pixels, each pixel comprising one or more Light Emitting Diodes (LEDs);
determining a wear compensation configuration that identifies which of the plurality of pixels are compensated pixels and which are non-compensated pixels, wherein the wear compensation configuration is a predetermined uniform and repeating pattern of pixels;
generating output frame data by adjusting the input frame data associated with the compensated pixels based on the degree of aging of the LEDs of the compensated pixels; and
sending the output frame data to the display.

12. The method of claim 11, wherein adjusting the input frame data comprises applying wear compensation to alternating scan lines.

13. The method of claim 11, wherein the compensated pixels to form a checkerboard pattern.

14. The method of claim 11, wherein adjusting the input frame data comprises applying wear compensation to one out of four of the plurality of pixels.

15. The method of claim 11, wherein the wear compensation configuration changes between successive image frames.

16. The method of claim 11, comprising determining the wear compensation configuration based at least in part on a resolution of the display.

17. The method of claim 11, comprising determining the wear compensation configuration based at least in part on a resolution of the display and a distance of the user from the display.

18. The method of claim 11, comprising increasing a level of wear compensation applied to the compensated pixels by an over-compensation factor.

19. The method of claim 11, wherein the electronic device is a laptop computer.

20. The method of claim 11, wherein the LEDs are Organic LEDs (OLEDs).

21. A non-transitory computer-readable medium, comprising instructions to direct a processor to implement aging compensation for a display, the instructions to direct the processor to:
receive input frame data corresponding to content to be displayed on a display of an electronic device, the display comprising a plurality of pixels, each pixel comprising one or more Light Emitting Diodes (LEDs);
determine a wear compensation configuration that identifies which of the plurality of pixels are compensated pixels and which are non-compensated pixels, wherein the wear compensation configuration is a predetermined uniform and repeating pattern of pixels;
generate output frame data by adjusting the input frame data associated with the compensated pixels based on the degree of aging of the LEDs of the compensated pixels; and
send the output frame data to the display.

22. The non-transitory computer-readable medium of claim 21, wherein the wear compensation configuration causes the output frame data to alternate between scan lines with compensated pixels and scan lines with non-compensated pixels.

23. The non-transitory computer-readable medium of claim 21, wherein the wear compensation configuration causes the compensated pixels to form a checkerboard pattern.

24. The non-transitory computer-readable medium of claim 21, wherein the wear compensation configuration causes wear compensation to be applied to one out of four of the plurality of pixels.

25. The non-transitory computer-readable medium of claim 21, comprising instructions that direct the processor to apply a different wear compensation configuration between successive image frames.

* * * * *